United States Patent
Subramanian et al.

(10) Patent No.: US 7,579,094 B2
(45) Date of Patent: Aug. 25, 2009

(54) USE OF BIASED FABRIC TO IMPROVE PROPERTIES OF SIC/SIC CERAMIC COMPOSITES FOR TURBINE ENGINE COMPONENTS

(75) Inventors: Suresh Subramanian, Mason, OH (US); James Dale Steibel, Hamilton, OH (US); Douglas Melton Carper, Trenton, OH (US); Brian Keith Flandermeyer, Rocky Hill, CT (US)

(73) Assignee: General Electric Company, Schenectady, NY (US)

( * ) Notice: Subject to any disclaimer, the term of this patent is extended or adjusted under 35 U.S.C. 154(b) by 371 days.

(21) Appl. No.: 11/424,722

(22) Filed: Jun. 16, 2006

(65) Prior Publication Data

US 2007/0082201 A1  Apr. 12, 2007

Related U.S. Application Data

(62) Division of application No. 10/784,734, filed on Feb. 23, 2004, now Pat. No. 7,306,826.

(51) Int. Cl.
*B32B 9/00* (2006.01)
(52) U.S. Cl. .................. 428/698; 428/701; 428/702; 416/241 B
(58) Field of Classification Search .................. None
See application file for complete search history.

(56) References Cited

U.S. PATENT DOCUMENTS 3,669,158 A   6/1972 Phillips (Continued)

FOREIGN PATENT DOCUMENTS

WO   98/17505   4/1998

OTHER PUBLICATIONS

Luthra, "Melt Infiltrated (MI) SiC/SiC Composites for Gas Turbine Applications", GE Research & Development Center Technical Information Series, 2001CRD112, Oct. 2001, Class 1.*

*Primary Examiner*—Timothy M Speer
(74) *Attorney, Agent, or Firm*—McNees Wallace & Nurick, LLC

(57) ABSTRACT

The present invention is a ceramic matrix composite turbine engine component, wherein the component has a direction of maximum tensile stress during normal engine operation. The component comprises a plurality of biased ceramic plies, wherein each biased ply comprises ceramic fiber tows, the tows being woven in a first warp direction and a second weft direction, the second weft direction lying at a preselected angular orientation with respect to the first warp direction, wherein a greater number of tows are woven in the first warp direction than in the second weft direction, and wherein a number of tows in the second weft direction allows the biased plies to maintain their structural integrity when handled. The plurality of biased plies are laid up in a preselected arrangement to form the component, and a preselected number of the plurality of biased plies are oriented such that the orientation of the first warp direction of the preselected number of biased plies lie about in the direction of maximum tensile stress during normal engine operation. A coating is applied to the plurality of biased plies. The coating is selected from the group consisting of BN, SiC, and combinations thereof. A ceramic matrix material lies in interstitial regions between the tows of each biased ply and the interstitial region between the biased plies.

12 Claims, 6 Drawing Sheets

U.S. PATENT DOCUMENTS

| | | | |
|---|---|---|---|
| 3,818,082 A | 6/1974 | Burns et al. | |
| 3,819,461 A | 6/1974 | Saffadi | |
| 3,925,587 A * | 12/1975 | Park | 442/21 |
| 3,991,248 A | 11/1976 | Bauer | |
| 4,384,021 A | 5/1983 | Aoyama | |
| 4,714,642 A | 12/1987 | McAliley et al. | |
| 5,015,540 A | 5/1991 | Borom et al. | |
| 5,298,303 A | 3/1994 | Kerr et al. | |
| 5,330,854 A | 7/1994 | Singh et al. | |
| 5,336,350 A | 8/1994 | Singh | |
| 5,370,911 A | 12/1994 | Throne et al. | |
| 5,436,042 A | 7/1995 | Lau et al. | |
| 5,609,912 A | 3/1997 | Lackey et al. | |
| 5,716,671 A | 2/1998 | Pak et al. | |
| 5,952,100 A * | 9/1999 | Corman et al. | 428/384 |
| 6,024,898 A | 2/2000 | Steibel et al. | |
| 6,258,737 B1 | 7/2001 | Steibel et al. | |
| 6,270,851 B1 | 8/2001 | Lee et al. | |
| 6,280,550 B1 | 8/2001 | Steibel et al. | |
| 6,294,125 B1 | 9/2001 | Bridgewater et al. | |
| 6,350,713 B1 | 2/2002 | Petrak | |

* cited by examiner

USE OF BIASED FABRIC TO IMPROVE PROPERTIES OF SIC/SIC CERAMIC COMPOSITES FOR TURBINE ENGINE COMPONENTS

This application is a Divisional of U.S. patent application Ser. No. 10/784,734, filed Feb. 23, 2004, the contents of which are incorporated herein by reference.

This invention was made with government support under Contract No. N00421-00-3-0536. The government may have certain rights to the invention.

FIELD OF THE INVENTION

The present invention relates generally to ceramic matrix turbine engine components, and more particularly, to a ceramic matrix composite turbine blade.

BACKGROUND OF THE INVENTION

In order to increase the efficiency and the performance of gas turbine engines so as to provide increased thrust-to-weight ratios, lower emissions and improved specific fuel consumption, engine turbines are tasked to operate at higher temperatures. As the higher temperatures reach and surpass the limits of the material comprising the components in the hot section of the engine and in particular the turbine section of the engine, new materials must be developed.

As the engine operating temperatures have increased, new methods of cooling the high temperature alloys comprising the combustors and the turbine airfoils have been developed. For example, ceramic thermal barrier coatings (TBCs) were applied to the surfaces of components in the stream of the hot effluent gases of combustion to reduce the heat transfer rate and to provide thermal protection to the underlying metal and allow the component to withstand higher temperatures. These improvements helped to reduce the peak temperatures and thermal gradients. Cooling holes were also introduced to provide film cooling to improve thermal capability or protection. Simultaneously, ceramic matrix composites were developed as substitutes for the high temperature alloys. The ceramic matrix composites (CMCs) in many cases provided an improved temperature and density advantage over the metals, making them the material of choice when higher operating temperatures were desired.

A number of techniques have been used in the past to manufacture turbine engine components, such as turbine blades using ceramic matrix composites. However, such turbine components, under normal operating conditions, experience varying degrees of local stresses. In the dovetail section of turbine blade components, relatively higher tensile stress regions are located in the outermost portion of the dovetail section. Ideally, the CMC component would be designed such that the component was stronger in the region of the local stresses. One method of manufacturing CMC components, set forth in U.S. Pat. Nos. 5,015,540; 5,330,854; and 5,336,350; incorporated herein by reference and assigned to the assignee of the present invention, relates to the production of silicon carbide matrix composites containing fibrous material that is infiltrated with molten silicon, herein referred to as the Silcomp process. The fibers generally have diameters of about 140 micrometers or greater, which prevents intricate, complex shapes, such as turbine blade components, to be manufactured by the Silcomp process.

Another technique of manufacturing CMC turbine blades is the method known as the slurry cast melt infiltration (MI) process. A technical description of such a slurry cast MI method is described in detail in U.S. Pat. No. 6,280,550 B1, which is assigned to the Assignee of the present invention and which is incorporated herein by reference. In one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. By "silicon carbide-containing fiber" is meant a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide. These examples are given for demonstration of the term "silicon carbide-containing fiber" and are not limited to this specific combination. Other fiber compositions are contemplated, so long as they include silicon carbide.

A major challenge in this approach is fiber coatings that are not uniform, due to the large number of cross-over points in the 2D balanced fabric. The boron nitride (BN) and SiC coatings that are applied to such balanced cloth, prior to slurry casting and silicon melt infiltration, are not consistently uniform due to the inability of the coatings to adhere readily to the large number of fiber cross-over points. In addition, fiber crimp, which is caused by weaving, causes the loss of in-plane properties, which diminishes the ability of the CMC component to endure higher local tensile stresses in the direction of the plane of the ply.

In addition, problems with high cycle fatigue (HCF) have been found to result in CMC component failure when the critical modes of vibration of current CMC components are within the operating range of the turbine engine. What is needed is a method of manufacturing CMC turbine engine components that permits a more uniform fiber coating. In addition, a method of manufacturing that addresses the local stress regions and/or ensures that the critical modes of vibration of the CMC turbine blade in the engine environment is not within the operating range of the engine is also needed.

SUMMARY OF THE INVENTION

Improvements in manufacturing technology and materials are the keys to increased performance and reduced costs for many articles. As an example, continuing and often interrelated improvements in processes and materials have resulted in major increases in the performance of aircraft gas turbine engines, such as the improvements of the present invention. The present invention is a novel method for manufacturing a turbine blade made from a ceramic matrix composite (CMC) using biased ceramic fabric rather than balanced ceramic fabric. The present invention produces a component that is stronger in the direction of the higher tensile stress that is found within discrete higher tensile stress regions within the component during normal engine operation, thereby improving the functionality of the component. In addition, the novel method of the present invention is useful in ensuring that the critical modes of vibration of the turbine blade in the turbine engine environment are not within the operating range of the turbine engine.

The present invention is a ceramic matrix composite turbine engine component, wherein the component has a direction of maximum tensile stress during normal engine operation. The component comprises a plurality of biased ceramic plies, wherein each biased ply comprises ceramic fiber tows, the tows being woven in a first warp direction and a second weft direction, the second weft direction lying at a preselected angular orientation with respect to the first warp direction, wherein a greater number of tows are woven in the first warp direction than in the second weft direction, and wherein a number of tows in the second weft direction allows the biased plies to maintain their structural integrity when handled. The plurality of biased plies are laid up in a preselected arrangement to form the component, and a preselected number of the plurality of biased plies are oriented such that the orientation of the first warp direction of the preselected number of biased plies lie about in the direction of maximum tensile stress during normal engine operation. A coating is applied to the plurality of biased plies. The coating is selected from the group consisting of BN, SiC, and combinations thereof. A ceramic matrix material lies in interstitial regions between the tows of each biased ply and the interstitial region between the biased plies.

The present invention is also a ceramic matrix composite turbine engine component, wherein the component has a direction of maximum tensile stress during normal engine operation, and comprises a plurality of ceramic plies, wherein each ply comprises ceramic fiber tows, and wherein the tows in each ply lie adjacent to one another in a planar arrangement such that each ply has a unidirectional orientation. A coating is applied to the plies. The coating is selected from the group consisting of BN, $Si_3N_4$, and combinations thereof. The plurality of plies are laid up in a preselected arrangement to form the component, wherein a preselected number of the plurality of plies are oriented such that the orientation of the preselected number of the plurality of plies lie in the direction of maximum tensile stress during normal engine operation. A ceramic matrix material lies in interstitial regions between the tows of each ply and the interstitial region between the plurality of plies.

The present invention is also a method of manufacturing a turbine engine component, the component having a direction of maximum tensile stress during normal engine operation, comprising several steps. The first step is providing a plurality of biased ceramic plies, each biased ply comprising ceramic fiber tows, the tows woven in a first warp direction and a second weft direction, the second weft direction lying at a preselected angular orientation with respect to the first warp direction, wherein a greater number of tows are woven in the first warp direction than in the second weft direction, and wherein a number of tows in the second weft direction allows the biased plies to maintain their structural integrity when handled. The next step is laying up the plurality of biased plies in a preselected arrangement to form a component shape, wherein a preselected number of the plurality of biased plies are oriented such that the orientation of the first warp direction of a preselected number of the plurality of biased plies lie about in the direction of maximum tensile stress during normal engine operation. The next step is rigidizing the component shape with a layer of BN and a layer of SiC to form a coated component preform using chemical vapor infiltration. The next step is partially densifying the coated component preform using carbon-containing slurry. The final step is further densifying the coated component preform with at least silicon to form a ceramic matrix composite aircraft engine component with biased architecture.

The present invention is a method of manufacturing a CMC turbine engine component with "biased" architecture using the slurry cast MI method. As defined herein, "biased" cloth plies have more fiber tows running in a first direction of the weave of the cloth, the warp direction, than in a second direction of the weave of the cloth, the weft direction. The biased cloth plies should have a ratio of warp fiber tows to weft fiber tows of at least about 2:1. Because of this bias, the warp direction of the fabric has greater tensile strength in the final CMC product than the weft direction. In the method of the present invention a preselected number of biased SiC-containing ceramic cloth plies are first laid up to form a turbine engine component shape, such that outer plies, which pass through regions of higher tensile stress, provide greater tensile strength. The shape is then rigidized with coatings of BN and SiC using chemical vapor infiltration (CVI) to form a coated turbine blade preform as known in the art. The preform is then partially densified with a carbon containing slurry as known in the art. The preform is then further densified with silicon to form a CMC turbine engine component with biased architecture as known in the art. CMC components that may be manufactured using such biased architecture include a turbine blade, a cooled turbine nozzle, and an uncooled turbine nozzle. In addition to SiC containing ceramic cloth plies, any other type of ceramic cloth plies that can be used to form CMC turbine engine components may be used with the method of the present invention.

The present invention is also a CMC turbine engine component with biased architecture. Such CMC turbine engine components with biased architecture include a turbine blade, a cooled turbine nozzle, and an uncooled turbine nozzle.

The present invention is also a method of manufacturing a ceramic matrix composite aircraft engine component, the component having a direction of maximum tensile stress during normal engine operation, comprising several steps. The first step is providing a plurality of prepreg ceramic plies, the plies comprising prepreg ceramic fiber tows, the tows in each ply lying adjacent to one another in a planar arrangement such that each ply has a unidirectional orientation. The next step is laying up the plurality of prepreg ceramic cloth plies in a preselected arrangement to form a component shape such that a preselected number of outermost plies are oriented at about 0° with respect to the direction of maximum tensile stress of the turbine engine component during normal engine operation. The next step is heating the turbine blade shape to form a ceramic preform. The final step is densifying the turbine blade preform with at least silicon to form a ceramic matrix composite turbine blade.

The present invention is also a method of manufacturing a CMC turbine blade with biased architecture using the "prepreg" MI method. First a preselected number of SiC prepregged plies are laid up in a preselected arrangement, such that a preselected number of the outermost plies are oriented about at 0°, forming a turbine blade shape. By "0° orientation" with respect to a prepreg ply, it is meant that a ply is laid up such that the line of the fiber tows is in the line of the long dimension or axis of the turbine blade as known in the art. A 90° orientation means that the ply is laid up such that line of the fiber tows is perpendicular to the long dimension or axis of the turbine blade as known in the art. All orientations other than 0° and 90° may be negative or positive depending on whether the ply is rotated clockwise (positive) from a preselected plane in the long dimension of the turbine blade or rotated counterclockwise (negative) from the preselected plane in the long dimension of the turbine blade as known in the art. Prepreg plies that are oriented at 0° have tensile strength in the final CMC product that is about twenty times greater than prepreg plies that are oriented at 90°. Such "prepregged" plies comprise silicon-carbide-containing fibers, where the fibers are bundled into tows and the tows are all adjacent to one another such that all of the fibers are oriented in the same direction. Exemplary processes for making such SiC/SiC prepreg material are described in U.S. Pat. Nos. 6,024,898 and 6,258,737, which are assigned to the Assignee of the present invention and which are incorporated herein by reference. The next step of the process is forming a ceramic preform by heating the turbine blade shape by compression molding, bladder molding, or autoclaving as known in the art. The final step of the process is densifying the preform with silicon to form a CMC turbine blade as known in the art.

CMC components that may be manufactured using the prepreg process of the present invention include a turbine blade, a cooled turbine nozzle, and an uncooled turbine nozzle. In addition to SiC containing prepreg ceramic cloth plies, any other type of prepreg ceramic cloth plies that can be used to form CMC turbine engine components may be used with the method of the present invention.

The present invention also provides a CMC turbine engine component manufactured with the prepreg process of the present invention. Such CMC turbine engine components with biased architecture include a turbine blade, a cooled turbine nozzle, and an uncooled turbine nozzle.

An advantage of the present invention is that the use of biased fabric in the slurry cast MI process results in significant fiber tow spreading during the step of rigidizing, which facilitates more uniform coating of the fibers with BN and SiC leading to improved mechanical properties and improved fracture toughness of the composite.

Another advantage of the present invention is that the use of biased fabric in the slurry cast MI process results in a lower number of fiber cross-over points in the fabric, which results in enhanced in-plane mechanical properties.

Another advantage of the present invention is that the use of biased fabric in the slurry cast MI process allows the tensile strength of the CMC composite to be tailored on a ply-by-ply basis, since the biased fabric has a greater tensile strength in the warp direction than the weft direction when processed into a CMC component.

Another advantage of the present invention is that the use of specific orientations of prepreg plies on a ply by ply basis allows the tensile strength of the CMC composite to be tailored, since the prepreg ply has a greater tensile strength in the 0° orientation than the 90° orientation when processed into a CMC component.

Another advantage of the present invention is that a CMC turbine bade can be manufactured so that the portions of the CMC turbine blade with higher tensile stresses can have plies in those regions with fibers running in the loading direction of the stresses, increasing the crack resistance of the CMC.

Another advantage of the present invention is that the modulus of elasticity of a CMC component can be tailored by selecting the orientation of the plies on a ply basis, which will ensure that the critical modes of vibration in an engine environment are not within the operating range of the of the CMC component.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
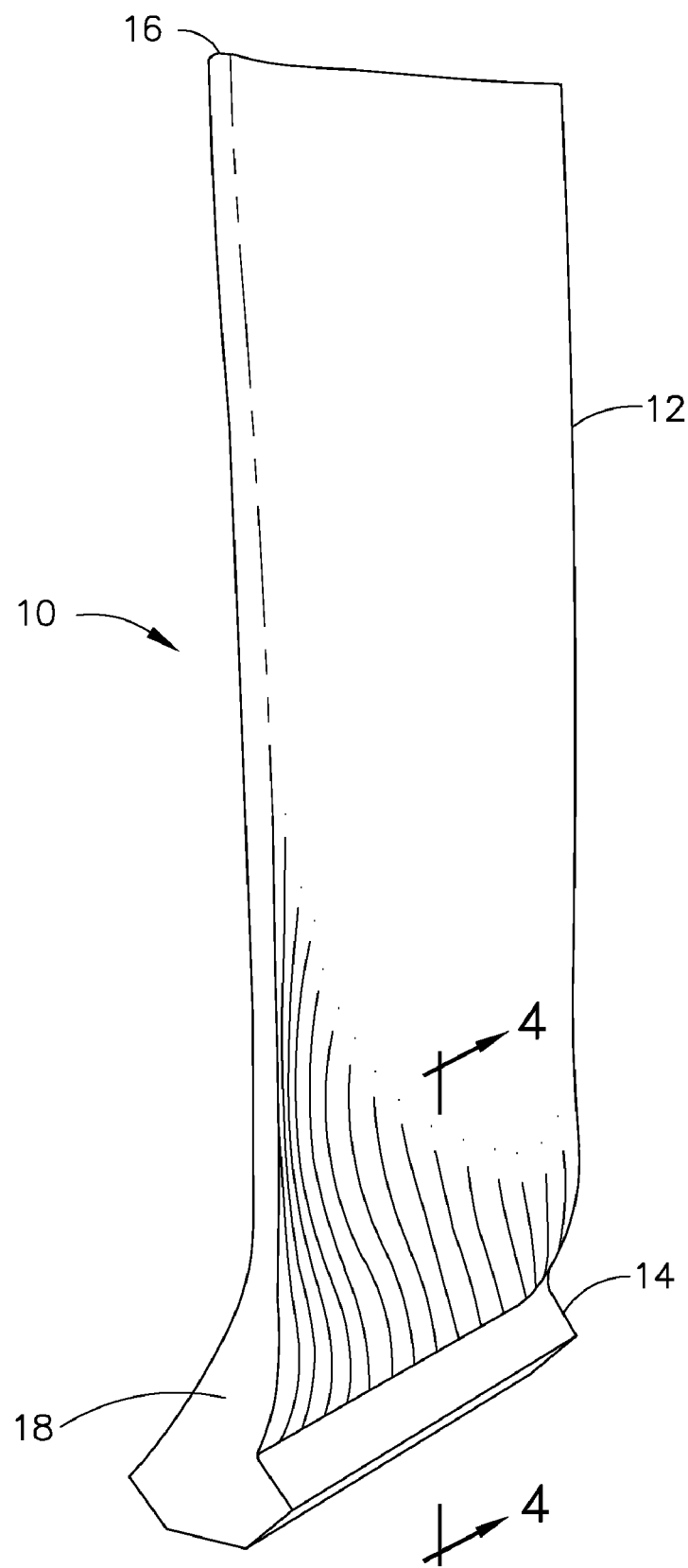
FIG. 1 is an exemplary example of a LPT blade in an aircraft engine.

FIG. 1 depicts an exemplary aircraft engine LPT blade 20. In this illustration a turbine blade 20 comprises a ceramic matrix composite material. The turbine blade 20 includes an airfoil 22 against which the flow of hot exhaust gas is directed. The turbine blade 20 is mounted to a turbine disk (not shown) by a dovetail 24 that extends downwardly from the airfoil 22 and engages a slot of similar geometry on the turbine disk. The LPT blade 20 of the present invention does not include an integral platform. A separate platform is provided to minimize the exposure of the dovetail 24 to hot gases of combustion. The airfoil may be described as having a root end 40, and an oppositely disposed tip end 32.

Figure 2:
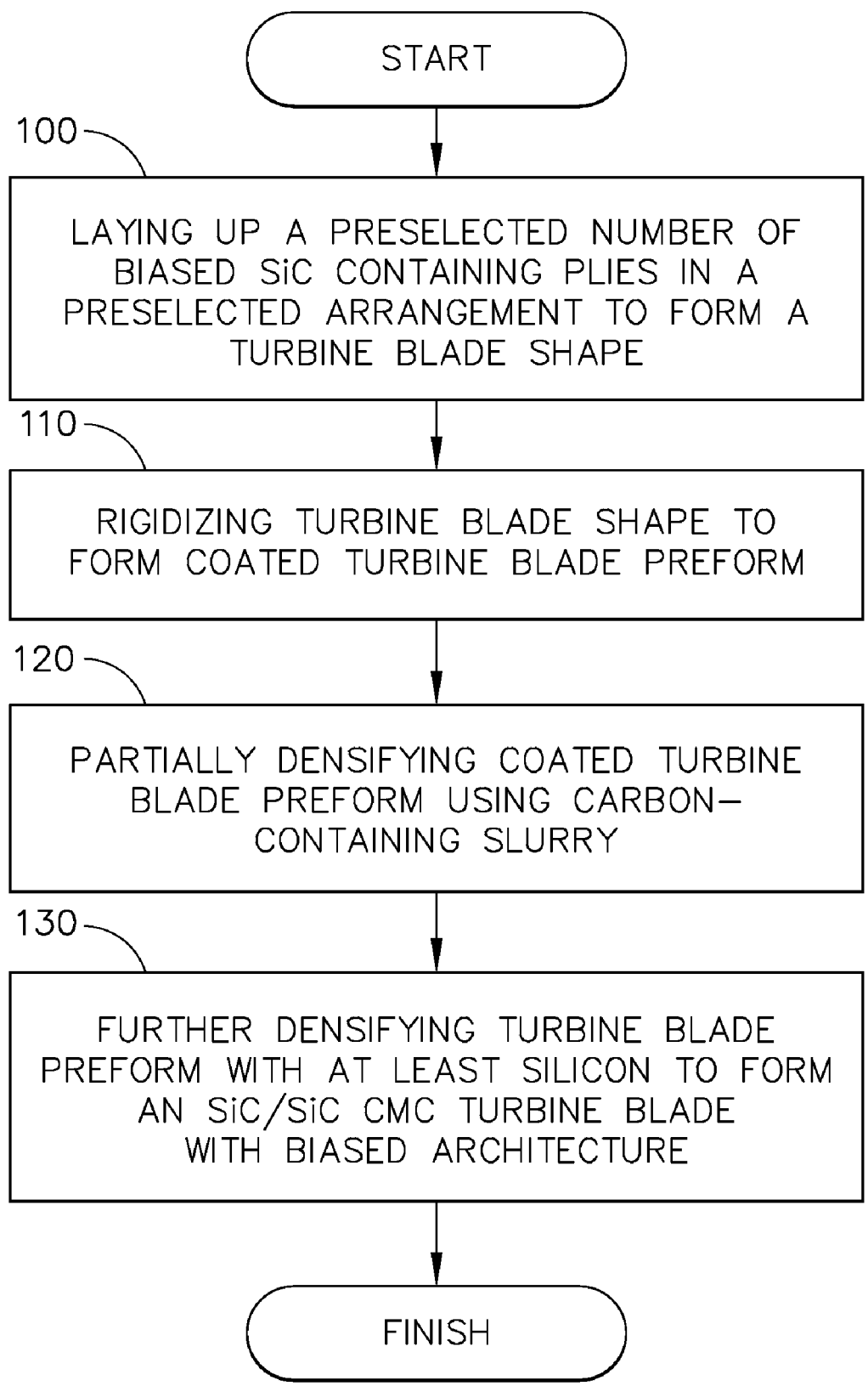
FIG. 2 is a flow chart illustrating a slurry cast MI method of manufacture of the present invention to produce a CMC turbine blade.
Figure 3:
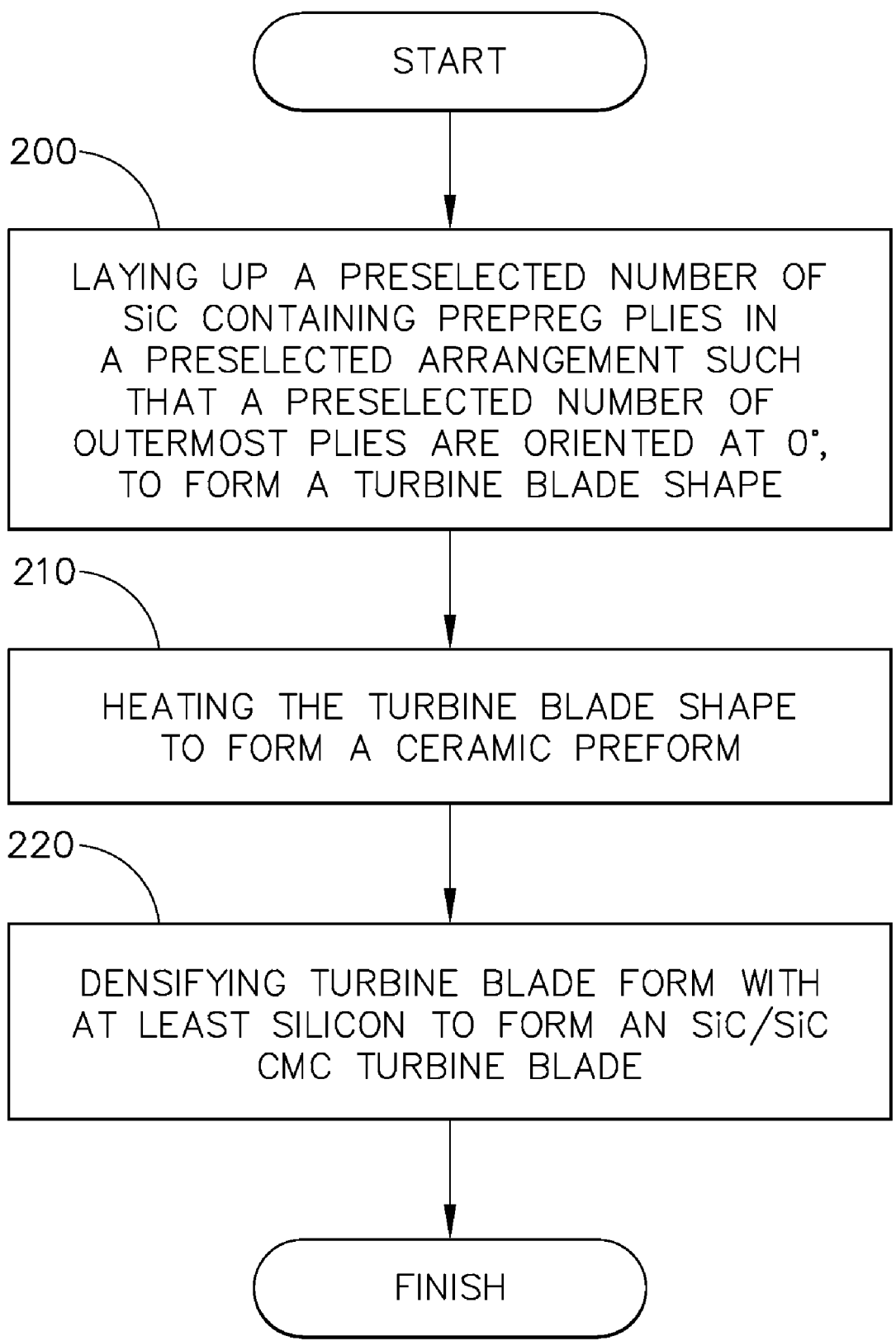
FIG. 3 a flow chart illustrating a prepreg MI method of manufacture of the present invention to produce a CMC turbine blade.

Referring now to FIG. 2 there is a shown flow chart illustrating a slurry cast MI method of manufacture of the present invention to produce a CMC turbine blade. The initial step 100 of the process is laying up a preselected number of biased SiC containing cloth plies of preselected geometry in a preselected arrangement to form a turbine blade shape. In a preferred embodiment, there are a preselected number of fiber tows woven in the weft direction sufficient to allow the SiC cloth to be handled and laid up without falling apart. A CMC element manufactured with biased SiC containing cloth plies has greater tensile strength in the warp direction of the SiC containing cloth plies than the weft direction. The tensile strength in the warp direction is up to about 25 percent greater than in the weft direction.

As the outermost region of a turbine blade dovetail has known regions of localized higher tensile stress in the direction of the long dimension or axis of the turbine blade during engine operation, the fact that the biased cloth plies have a greater tensile strength in the warp direction than in the weft direction is used in the selection of the orientation of the outermost plies of the turbine blade shape. A preselected number of the outermost plies of the turbine blade shape are laid up at an orientation of about 0° so that the plies that pass through regions of localized higher tensile stress have more fiber tows that run in the loading direction of the stresses than the opposite direction. The outermost plies that lie within the regions of localized higher tensile stress must have more plies laid up at an orientation of about 0° than laid up in other orientations. Such orientation increases the fracture toughness of the final CMC component. By "0° orientation", it is meant that the SiC containing cloth is laid up so that the warp direction of the cloth is in the line of the axis of the turbine blade as known in the art. A 90° orientation means that the cloth is laid up so that the warp direction of the cloth is in the line perpendicular to the long axis of the turbine blade as known in the art. The All orientations other than 0° and 90° may be negative or positive depending on whether the ply is rotated clockwise (positive) from a preselected plane or axis in the long dimension of the turbine blade or rotated counterclockwise (negative) from the preselected plane in the long dimension of the turbine blade as known in the art. The remaining plies that do not pass through the regions of localized higher tensile stress may be arranged in any appropriate orientation as known in the art. For example, the remaining plies could all be laid up in an alternating formation such that the remaining plies are at about a 45° orientation, followed by about a −45° orientation, followed by about a 45° orientation, followed by a −45° orientation, etc. as is known in the art, or such that the remaining plies are at a −45° orientation, followed by a 0° orientation, followed by a +45° orientation, followed by a 90°, or in any other mechanically acceptable arrangement.

In addition, it is well known in the art that the HCF response of a turbine blade is controlled by the modulus of the material used to manufacture the turbine blade. As the biased fabric allows control over the directional tensile strength of the CMC turbine blade on a ply by ply basis, the weave of the individual plies can be controlled, and the plies may be laid up so that the modulus of elasticity of the densified CMC turbine blade is such that the critical modes of vibration in the CMC turbine blade are not within the operating range of the turbine engine. In addition, the lower number of cross-over points in the fabric result in enhanced in-plane mechanical properties as more of the fiber tows are oriented in a more linear direction.

Once the plies are laid up, the next step 120 is rigidizing the turbine blade shape by applying BN and SiC coatings using a chemical vapor infiltration (CVI) process as is known in the art, forming a rigid coated turbine blade preform. The use of a larger number of fibers running in the warp direction of the cloth reduces the number of fiber cross-over points in the fabric, which enables more consistently uniform coatings of BN and SiC. In addition, the use of biased SiC containing fabric results in fiber tow spreading during the step of rigidizing as the tows are not held as tightly together as they are in balanced SiC containing fabric. Such spreading, however, is not so extensive as to cause the fabric to lose its form. The spreading facilitates more uniform coating of the fibers with BN and SiC. Such uniform coating provides the final CMC component with improved mechanical properties, including improved modulus of elasticity, improved tensile strength, and improved fracture toughness.

The next step 130 is partially densifying the coated turbine blade preform by introducing a carbon-containing slurry, as is known in the art, into the porosity of the coated turbine blade preform. The final step 140 is further densifying the turbine blade preform with at least silicon, and preferably boron doped silicon, through an MI process, as known in the art, forming a SiC/SiC CMC turbine blade with biased architecture.

In another embodiment of the present invention, the first step 200 of the present invention is laying up a preselected number of prepreg fabric plies in a preselected arrangement to form the shape of a turbine blade, where a preselected outer number of prepreg plies are laid up in the 0° orientation. A prepreg ply that has an orientation of 0° with respect to the tensile stresses has a tensile strength that is about twenty times greater than a prepreg ply that has an orientation of 90° with respect to the tensile stresses in the final CMC material. As the outermost region of turbine blade dovetails have known regions of localized higher tensile stress in the direction of the axis of the turbine blade during engine operation, the fact that the 0° prepreg plies have a greater tensile strength than the 90° prepreg plies is used in the selection of the orientation of the outermost plies of the turbine blade shape.

A preselected number of the outermost plies of the turbine blade shape are laid up at an orientation of 0° to the tensile load so that the plies that pass through the regions of localized higher tensile stress have fiber tows that run in the loading direction of the stresses. The outermost plies that lie within the regions of localized higher tensile stress must have more plies laid up an orientation of about 0° than laid up in other orientations. The remaining plies that do not pass through the regions of localized higher tensile stress may be arranged in any appropriate orientation as known in the art. For example, the remaining plies could all be laid up in an alternating formation such that the remaining plies are at a 45° orientation, followed by −45° orientation, followed by a 45° orientation, followed by a −45° orientation, etc. as known in the art.

It is well known in the art that the high cycle fatigue (HCF) response of a turbine blade is controlled by the modulus of the material. As the orientation of the prepreg plies allows control over the stiffness of the CMC turbine blade on a ply by ply basis, the orientation of the individual plies and the plies themselves may be arranged so that the modulus of elasticity of the final CMC turbine blade is such that the critical modes of vibration in the CMC turbine blade are not within the operating range of the turbine engine.

The next step 210 is heating the turbine blade shape as known in the art to form a ceramic turbine blade preform by compression molding, bladder molding, or autoclaving as known in the art. The final step 220 is densifying the turbine blade preform with at least silicon, and preferably boron doped silicon, through an MI process, as known in the art, forming a densified SiC/SiC CMC turbine blade. The present invention is also a method of manufacturing a turbine engine component wherein a plurality of plies of biased ceramic cloth are provided and laid up in a preselected arrangement to form a turbine engine component shape. The turbine engine component shape is then rigidized to form a coated turbine blade preform. The coated turbine blade preform is then partially densified using carbon-containing slurry. The turbine blade preform is then further densified with at least silicon to form a ceramic matrix composite aircraft engine component with biased architecture. The biased ceramic cloth plies may be silicon carbide containing plies.

Figure 4:
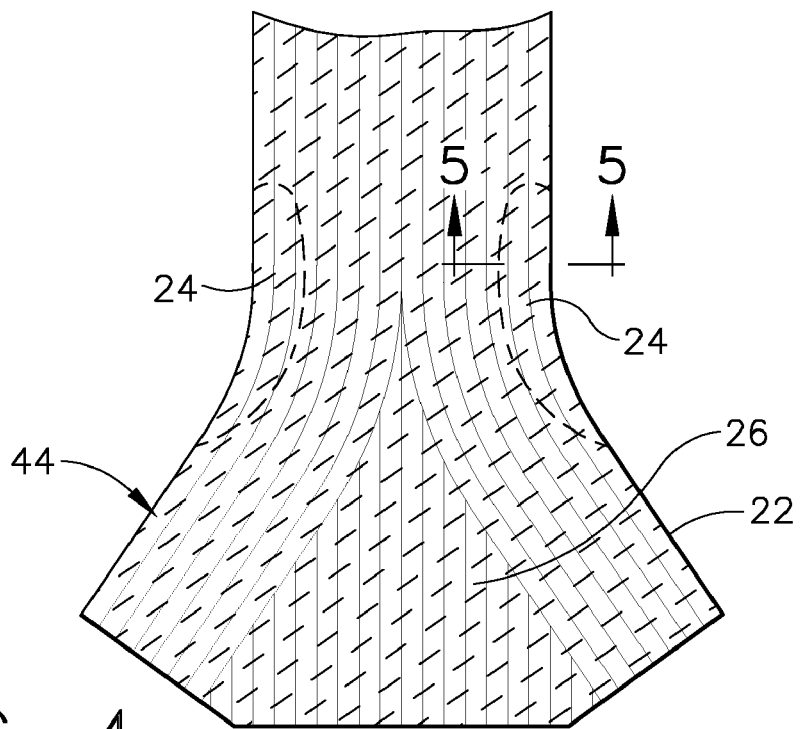
FIG. 4 is a cross-sectional view of a CMC LPT blade dovetail of the present invention manufactured using a prepreg MI method of manufacture and showing the higher tensile stress region and the lower tensile stress region.
Figure 5:
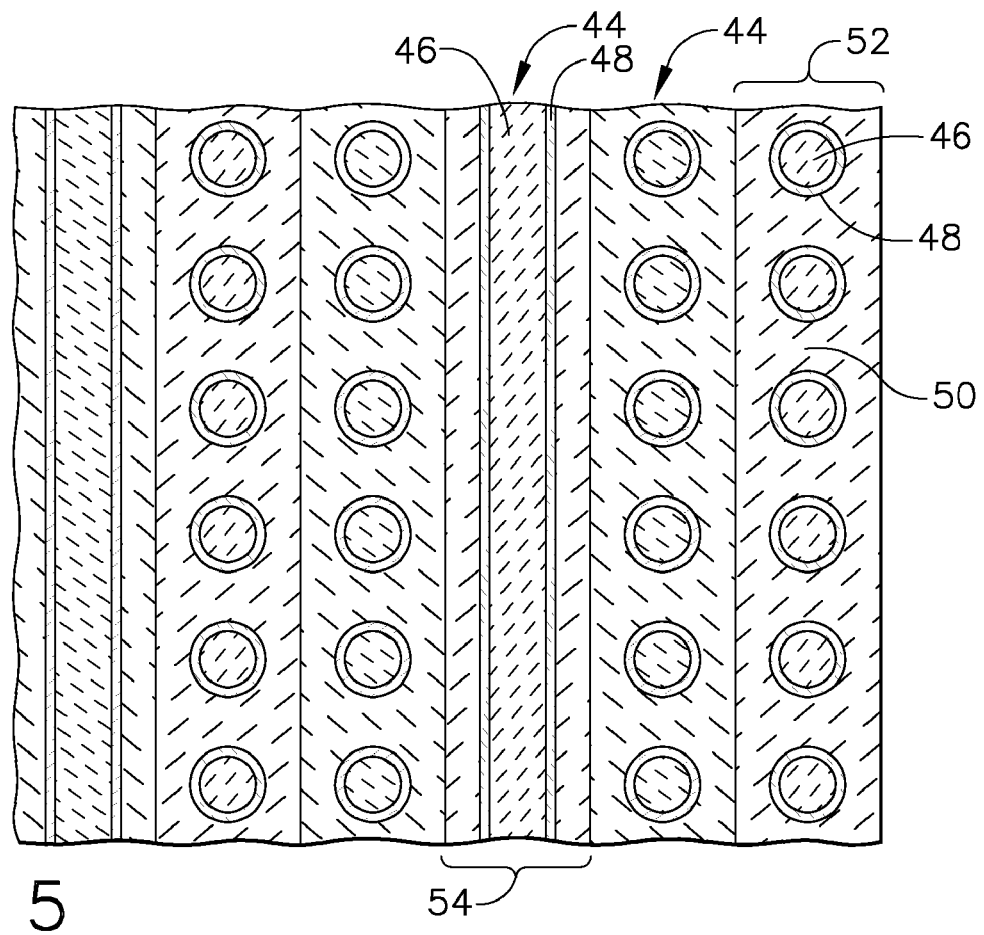
FIG. 5 is a cross-sectional view of a CMC LPT blade dovetail of the present invention manufactured using a prepreg MI method of manufacture and showing the outermost plies of the dovetail.

As shown in FIG. 4, which is an example of a cross-sectional view of a CMC LPT blade 20 dovetail 22 of the present invention manufactured with the prepreg MI process, the two higher tensile stress regions 24 and the lower tensile stress region 26 are evident. A dashed line shows the separation between the stress regions 24 and 26. The blade 20 comprises a plurality of ceramic prepreg plies 44 within a ceramic interstitial matrix 50. FIG. 5, is a cross-section of the outermost plies 44 within the higher tensile stress region 24 taken at line 5-5 in FIG. 4. Each prepreg CMC ply 44 comprises ceramic prepreg tows 46, the coating 48 on the tows 46, and the interstitial ceramic matrix 50 between the tows 46 and plies 44. As can be seen from FIG. 5, more of the plies 44 are 0° oriented plies 52 than are 90° oriented plies 54.

Figure 6:
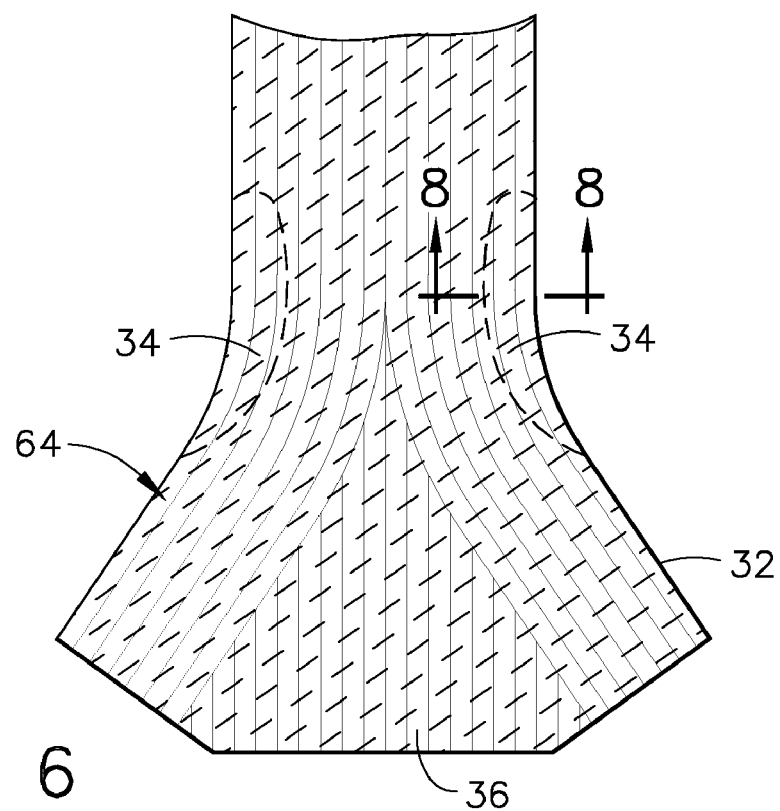
FIG. 6 is a cross-sectional view of a CMC LPT blade dovetail of the present invention manufactured using a slurry cast MI method of manufacture and showing the higher tensile stress region and the lower tensile stress region.
Figure 7:
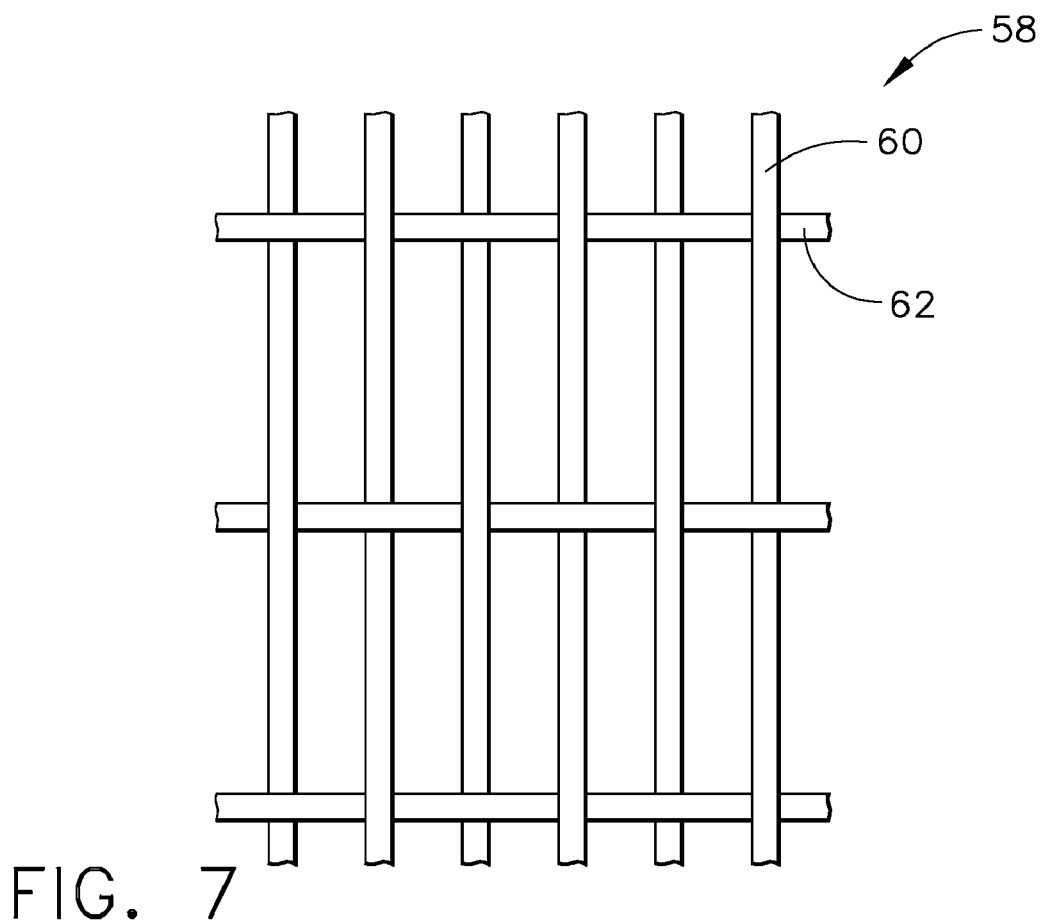
FIG. 7 is a portion of a biased ceramic ply used in the manufacture of the slurry cast MI method of CMC component manufacture.
Figure 8:
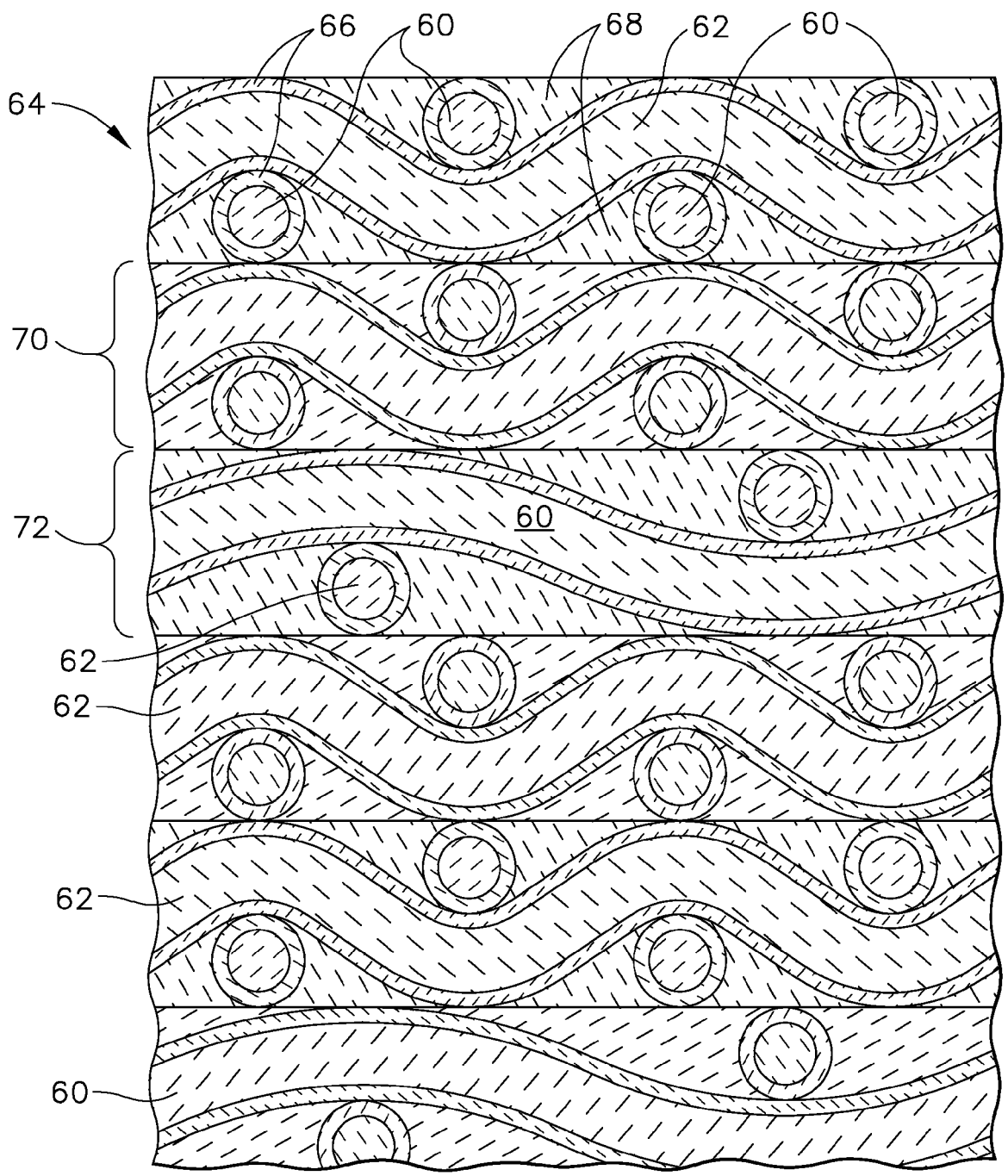
FIG. 8 is a cross-sectional view of a CMC LPT blade dovetail of the present invention manufactured using a prepreg MI method of manufacture and showing the outermost plies of the dovetail.

As shown in FIG. 6, which is an example of a cross-sectional view of a CMC LPT blade 30 dovetail 32 of the present invention manufactured with the slurry cast MI process, the two higher tensile stress regions 34 and the lower tensile stress region 36 are evident. A dashed line shows the separation between the stress regions 34 and 36. The blade 30 comprises a plurality of biased ceramic slurry cast plies 64 within an interstitial ceramic matrix 68. FIG. 7 shows one example of a biased ceramic cloth ply 58 prior to lay up. As can be seen from FIG. 8, which is a portion of a biased ceramic cloth ply 58, the biased ceramic ply 58 comprises more warp ceramic tows 60 than weft ceramic tows 62, with a ratio of at least 2 warp ceramic tows 60 to every weft ceramic tow 62. This is also evident in FIG. 8, which is a cross-section of the outermost plies 64 within the higher tensile stress region 34 taken at line 8-8 in FIG. 6. Each biased slurry cast CMC ply 64 comprises warp ceramic tows 60 and weft ceramic tows 62. The coating 66 on the tows 60, 62, and the interstitial ceramic matrix between the tows 60, 62 and plies 64. As can be seen from FIG. 8, more of the plies 64 are 0° oriented plies 64 than are 90° oriented plies 66.

The present invention also includes a ceramic matrix composite turbine engine component, such as a turbine blade, a cooled turbine nozzle, or an uncooled turbine nozzle, wherein the component is initially laid up in a preselected arrangement using a preselected number of biased ceramic fabric plies. The biased ceramic fabric may be silicon carbide containing fabric.

The present invention also includes a ceramic matrix composite turbine engine component, such as a turbine blade, a cooled turbine nozzle, or an uncooled turbine nozzle, wherein the component is initially laid up in a preselected arrangement using a preselected number of prepreg ceramic plies, wherein at least some of the prepreg plies are oriented such that the orientation of the fiber tows in the at least some of the prepreg plies is substantially in the line of the direction of the tensile stress of the turbine engine component during normal engine operation. The prepreg plies may be silicon carbide containing prepreg plies.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A ceramic matrix composite rotatable turbine engine component, the rotatable turbine engine component having a direction of maximum tensile stress during normal engine operation, wherein normal engine operation includes rotation of the rotatable turbine engine component comprising:
   a plurality of biased ceramic plies, each biased ply comprising ceramic fiber tows, the tows woven in a first warp direction and a second weft direction, the second weft direction lying at a preselected angular orientation with respect to the first warp direction, wherein a greater number of tows are woven in the first warp direction than in the second weft direction, and wherein a number of tows in the second weft direction allows the biased plies to maintain their structural integrity when handled;
   the plurality of biased plies laid up in a preselected arrangement to form the component, wherein a preselected number of the plurality of biased plies are oriented such that the orientation of the first warp direction of the preselected number of biased plies lie about in the direction of maximum tensile stress during normal engine operation;
   a coating applied to the plurality of biased plies, the coating selected from the group consisting of BN, SiC, and combinations thereof; and
   a ceramic matrix material lying in interstitial regions between the tows of each biased ply and the interstitial region between the biased plies.

2. The ceramic matrix composite rotatable turbine engine component of claim 1, wherein a ratio of a number of tows in the first warp direction to the number of tows in the second weft direction in each of the biased ceramic plies is at least about 2:1.

3. The ceramic matrix composite rotatable turbine engine component of claim 1, wherein the ceramic matrix material is silicon carbide.

4. The turbine engine component of claim 3, wherein the rotatable turbine engine component is a turbine blade.

5. The turbine engine component of claim 3, wherein the rotatable turbine engine component is a cooled turbine nozzle.

6. The turbine engine component of claim 3, wherein the rotatable turbine engine component is an uncooled turbine nozzle.

7. The ceramic matrix composite rotatable turbine engine component of claim 6, wherein a ratio of a number of tows in the first warp direction to the number of tows in the second weft direction in each of the biased ceramic fiber plies is at least about 2:1.

8. A ceramic matrix composite rotatable turbine engine component, the rotatable turbine engine component having a direction of maximum tensile stress during normal engine operation, wherein normal engine operation includes rotation of the rotatable turbine engine component comprising:
   a plurality of ceramic plies, each ply comprising ceramic fiber tows, the tows in each ply lying adjacent to one another in a planar arrangement such that each ply has a unidirectional orientation;
   a coating applied to the plies, the coating selected from the group consisting of BN, $Si_3N_4$, and combinations thereof;
   the plurality of plies laid up in a preselected arrangement to form the component, wherein a preselected number of the plurality of plies are oriented such that the orientation of the preselected number of the plurality of plies lie in the direction of maximum tensile stress during normal engine operation; and
   a ceramic matrix material lying in interstitial regions between the tows of each ply and the interstitial region between the plurality of plies.

9. The rotatable ceramic matrix composite turbine engine component of claim 8, wherein the ceramic matrix material is silicon carbide.

10. The turbine engine component of claim 9, wherein the rotatable turbine engine component is a turbine blade.

11. The turbine engine component of claim 9, wherein the rotatable turbine engine component is a cooled turbine nozzle.

12. The rotatable turbine engine component of claim 9, wherein the component is an uncooled turbine nozzle.

* * * * *